United States Patent
Sung

(10) Patent No.: US 9,939,979 B2
(45) Date of Patent: Apr. 10, 2018

(54) APPARATUS AND METHOD FOR PERFORMING CAPTURE IN PORTABLE TERMINAL

(75) Inventor: Yeul-Tak Sung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 663 days.

(21) Appl. No.: 13/570,051

(22) Filed: Aug. 8, 2012

(65) Prior Publication Data

US 2013/0332878 A1  Dec. 12, 2013

(30) Foreign Application Priority Data

Aug. 8, 2011  (KR) .................. 10-2011-0078721

(51) Int. Cl.
*G06F 3/01* (2006.01)
*G06F 3/0481* (2013.01)
(Continued)

(52) U.S. Cl.
CPC ............ *G06F 3/0481* (2013.01); *G06F 3/017* (2013.01); *G06F 3/0488* (2013.01); *H04N 1/0044* (2013.01); *H04N 1/00411* (2013.01); *H04N 1/00427* (2013.01); *H04N 1/00442* (2013.01); *H04N 1/00461* (2013.01); *H04N 1/00474* (2013.01); *H04N 1/2112* (2013.01); *H04N 5/23216* (2013.01); *H04N 5/23293* (2013.01); *H04N 2201/328* (2013.01); *H04N 2201/3252* (2013.01); *H04N 2201/3261* (2013.01); *H04N 2201/3266* (2013.01); *H04N 2201/3273* (2013.01)

(58) Field of Classification Search
CPC ...................................................... G06F 3/017
See application file for complete search history.

(56) References Cited

U.S. PATENT DOCUMENTS 6,219,679 B1 *  4/2001  Brisebois .......... G06F 17/30855
                                                707/E17.013
6,249,283 B1 *  6/2001  Ur ...................... G06K 9/2054
                                                        382/182

(Continued)

FOREIGN PATENT DOCUMENTS

EP          2495953           9/2012
KR     1020070044303 A        4/2007
(Continued)

OTHER PUBLICATIONS

TechSmith, "Snagit Help Document," May 2010, http://download.techsmith.com/snagit/docs/onlinehelp/enu/10/Snagit-10-Help.pdf.*

(Continued)

*Primary Examiner* — Ryan Barrett

(57) ABSTRACT

An apparatus and method for specifying a capture region, performing a picture capture for a specific region (partial region) on an output picture, and verifying contents of capture data copied to a clipboard. The apparatus includes a capture window setting unit configured to output a capture window specifying a region to be captured, and change a setting of the capture window. The apparatus also includes a data processing unit configured to acquire capture data for a region corresponding to the capture window when the setting of the capture window is completed.

6 Claims, 7 Drawing Sheets

(51) Int. Cl.
*H04N 1/00* (2006.01)
*H04N 1/21* (2006.01)
*H04N 5/232* (2006.01)
*G06F 3/0488* (2013.01)

(56) References Cited

U.S. PATENT DOCUMENTS

| | | | |
|---|---|---|---|
| 6,538,673 B1* | 3/2003 | Maslov | G06F 17/3089 707/E17.116 |
| 7,478,336 B2* | 1/2009 | Chen et al. | 715/770 |
| 7,631,268 B2* | 12/2009 | McGowan | G06F 17/24 715/769 |
| 8,276,090 B2* | 9/2012 | Chen et al. | 715/770 |
| 8,656,295 B2* | 2/2014 | Decker | 715/770 |
| 8,751,923 B2* | 6/2014 | Nagao | 715/234 |
| 2002/0037104 A1* | 3/2002 | Myers et al. | 382/187 |
| 2003/0011683 A1* | 1/2003 | Yamasaki et al. | 348/207.1 |
| 2003/0101412 A1* | 5/2003 | Eid | G06F 17/30893 715/234 |
| 2003/0177500 A1* | 9/2003 | Nakamura et al. | 725/105 |
| 2003/0214531 A1* | 11/2003 | Chambers et al. | 345/764 |
| 2004/0090548 A1 | 5/2004 | Obrador | |
| 2004/0252887 A1 | 12/2004 | Lim et al. | |
| 2004/0257346 A1* | 12/2004 | Ong et al. | 345/179 |
| 2005/0154994 A1* | 7/2005 | Chen | G06F 9/543 715/770 |
| 2005/0281437 A1* | 12/2005 | Fruchter et al. | 382/113 |
| 2006/0041589 A1* | 2/2006 | Helfman et al. | 707/104.1 |
| 2006/0075353 A1* | 4/2006 | DeSpain | G06F 17/24 715/770 |
| 2006/0294477 A1* | 12/2006 | Cheng et al. | 715/810 |
| 2007/0033544 A1* | 2/2007 | Fleisher et al. | 715/800 |
| 2007/0091194 A1* | 4/2007 | Kwak | 348/333.01 |
| 2007/0106952 A1* | 5/2007 | Matas | G06F 17/30905 715/764 |
| 2008/0079823 A1 | 4/2008 | Kojima | |
| 2008/0307301 A1* | 12/2008 | Decker | G06F 17/30905 715/241 |
| 2009/0015703 A1* | 1/2009 | Kim et al. | 348/333.12 |
| 2009/0112572 A1 | 4/2009 | Thorn | |
| 2009/0141934 A1* | 6/2009 | Caillon et al. | 382/102 |
| 2009/0164883 A1* | 6/2009 | Decker | G06F 17/3089 715/234 |
| 2009/0207282 A1* | 8/2009 | Sasaki et al. | 348/240.3 |
| 2009/0227283 A1* | 9/2009 | Pylvanainen | G06F 1/1626 455/556.1 |
| 2009/0322893 A1 | 12/2009 | Stallings et al. | |
| 2010/0156941 A1* | 6/2010 | Seung | 345/660 |
| 2010/0157366 A1* | 6/2010 | Lee et al. | 358/1.15 |
| 2010/0162163 A1* | 6/2010 | Wang et al. | 715/800 |
| 2010/0199187 A1* | 8/2010 | Lin et al. | 715/733 |
| 2010/0248788 A1* | 9/2010 | Yook | G06F 3/0481 455/566 |
| 2011/0013049 A1 | 1/2011 | Thorn | |
| 2011/0019058 A1 | 1/2011 | Sakai et al. | |
| 2011/0083099 A1* | 4/2011 | Eun | 715/786 |
| 2011/0249900 A1* | 10/2011 | Thorn | G06F 3/017 382/195 |
| 2012/0005607 A1* | 1/2012 | Tofinetti et al. | 715/769 |
| 2012/0066595 A1 | 3/2012 | Sung et al. | |
| 2012/0110486 A1* | 5/2012 | Sirpal | G06F 9/543 715/770 |
| 2012/0144331 A1* | 6/2012 | Tolonen | G06F 3/0484 715/769 |
| 2012/0162459 A1* | 6/2012 | Cheng | 348/222.1 |
| 2012/0169901 A1* | 7/2012 | Chang | 348/238 |
| 2012/0289290 A1* | 11/2012 | Chae | G06F 3/0488 455/566 |
| 2013/0104054 A1* | 4/2013 | Cao et al. | 715/753 |

FOREIGN PATENT DOCUMENTS

| | | |
|---|---|---|
| KR | 1020100074568 A | 7/2010 |
| WO | WO 2006/022656 A2 | 3/2006 |
| WO | WO 2011/052457 | 5/2011 |

OTHER PUBLICATIONS

European Search Report dated Apr. 3, 2013 in connection with European Patent Application No. 12179561.1, 10 pages.
Office Action issued for EP 12179561.1 dated Feb. 2, 2016, 6 pgs.
Foreign Communication from a Related Counterpart Application, Korean Application No. 10-2011-0078721, Notice of Preliminary Rejection dated May 16, 2017, 9 pages.
Communication from a foreign patent office in a counterpart foreign application, Text of Notice of Patent Grant, Korean Application No. KR 10-2011-0078721, Nov. 27, 2017, 4 pages.
Communication from a foreign patent office in a counterpart foreign application, Text of Communication pursuant to Article 94(3) EPC, European Application No. EP 12 179 561.1. Dec. 1, 2017, 6 pages.

* cited by examiner

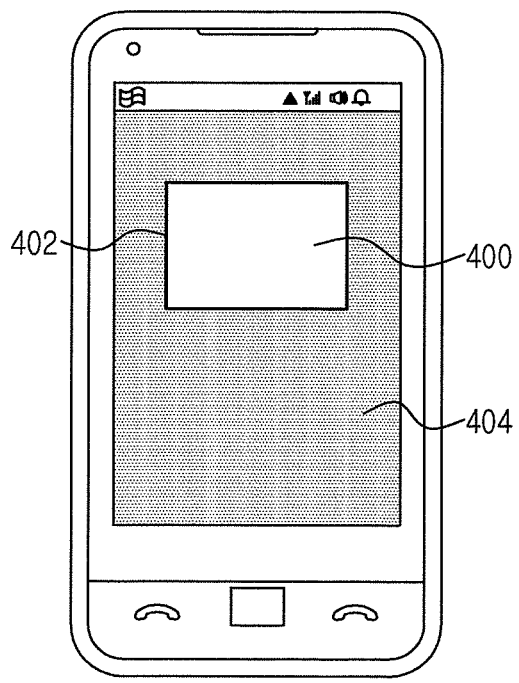
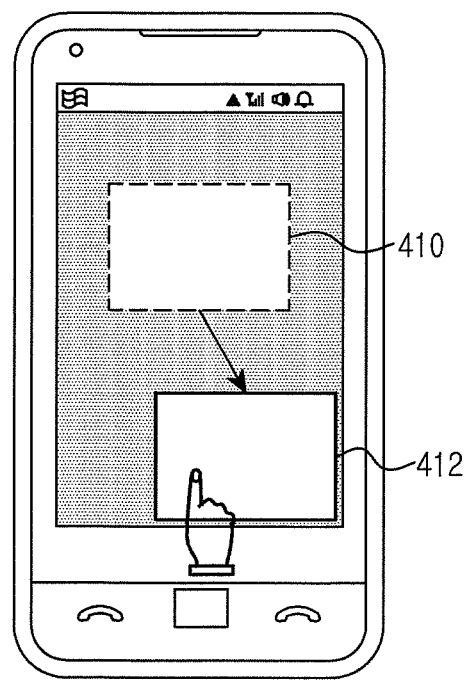
FIG.4A  FIG.4B
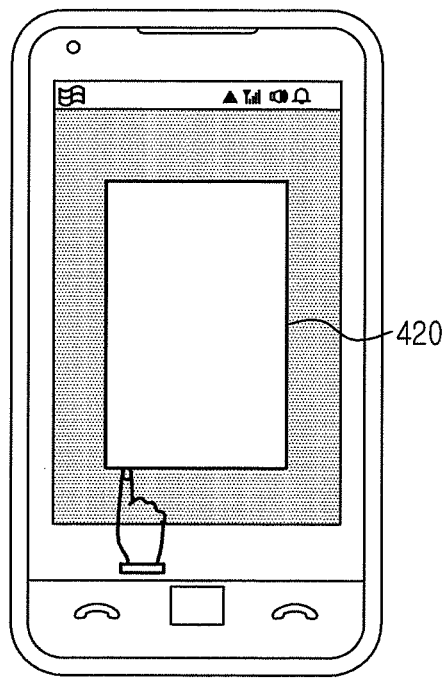
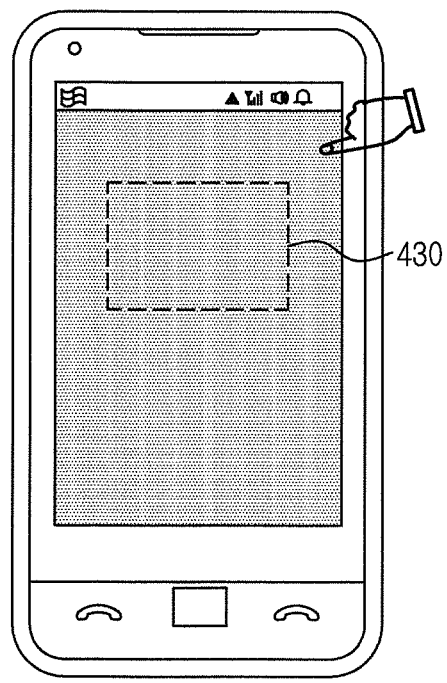
FIG.4C  FIG.4D

APPARATUS AND METHOD FOR PERFORMING CAPTURE IN PORTABLE TERMINAL

CROSS-REFERENCE TO RELATED APPLICATION AND CLAIM OF PRIORITY

The present application is related to and claims the benefit under 35 U.S.C. § 119(a) of a Korean patent application filed in the Korean Intellectual Property Office on Aug. 8, 2011 and assigned Ser. No. 10-2011-0078721, the entire disclosure of which is hereby incorporated by reference.

TECHNICAL FIELD OF THE INVENTION

The present disclosure relates to an apparatus and method for capturing an output picture of a portable terminal. More particularly, the present disclosure relates to an apparatus and method for specifying a capture region, performing a picture capture for a specific region (partial region) on an output picture, and verifying contents of a capture data copied to a clipboard.

BACKGROUND OF THE INVENTION

Portable terminals have become necessities of modern life for people of all ages. Thus, service providers and terminal manufacturers are competitively developing differentiated products and services.

For example, the portable terminal has developed into a multimedia device capable of providing various services such as a phonebook service, a game service, a short message service, an e-mail service, a wake-up call service, an MPEG-1 Audio Layer 3 (MP3) service, a scheduling service, a digital camera service, a multimedia message service, and a wireless Internet service.

When a user uses the above-described services, the user may clip photographs, paintings, writing, and the like, that are shown on a picture separately. A commonly used method includes a process of directly recording a memo of contents on an output picture or a process of capturing an output picture.

The process of capturing the output picture is a process of storing output contents as images without directly recording a memo of the output contents. The portable terminal stores a full output picture (i.e., an entire picture) as an image. In addition, the portable terminal pastes captured data to an application in the form of a memo note. Also, the portable terminal stores the captured data in a clipboard and pastes the stored data to a position where the user wants to store the data. Accordingly, there is a problem in that the portable terminal captures a full output picture and also pastes a picture the user does not need.

In addition, as the portable terminal stores the capture data in the clipboard, the user of the portable terminal may not verify whether the capture data is accurately captured according to his or her purposes. This means that the user may not verify contents of the capture data stored in the clipboard.

Accordingly, in order to solve the above-described problem, an apparatus and method for performing a picture capture for a specific region and visually providing information of captured data in a portable terminal is needed.

SUMMARY OF THE INVENTION

To address the above-discussed deficiencies of the prior art, it is a primary object to provide at least the advantages described below. Accordingly, an aspect of the present disclosure is to provide an apparatus and method for selecting a region to be captured in a portable terminal.

Another aspect of the present disclosure is to provide an apparatus and method for providing a list of captured data in a portable terminal.

Another aspect of the present disclosure is to provide an apparatus and method for selectively editing captured data on the list of the captured data in a portable terminal.

In accordance with an aspect of the present disclosure, an apparatus for performing picture capture in a portable terminal is provided. The apparatus includes a capture window setting unit configured to output a capture window specifying a region to be captured, and change a setting of the capture window. The apparatus also includes a data processing unit configured to acquire capture data for a region corresponding to the capture window when the setting of the capture window is completed.

In accordance with another aspect of the present disclosure, a method of performing picture capture in a portable terminal is provided. The method includes outputting a capture window specifying a region to be captured, changing a setting of the capture window, and acquiring capture data for a region corresponding to the capture window when the setting of the capture window is completed.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A through 4D illustrate a process of setting a capture window in a portable terminal according to one embodiment of the present disclosure;

DETAILED DESCRIPTION OF THE INVENTION

FIGS. 1 through 6E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable device. Exemplary embodiments of the present disclosure will be described herein below with reference to the accompanying drawings. In the following description, well-known functions or constructions are not described in detail since they would obscure the disclosure in unnecessary detail.

Hereinafter, a description will be given with respect to an apparatus and method for capturing a specific region of an output picture and providing a list of the captured data to improve picture capture performance of a portable terminal according to the present disclosure.

Figure 1:
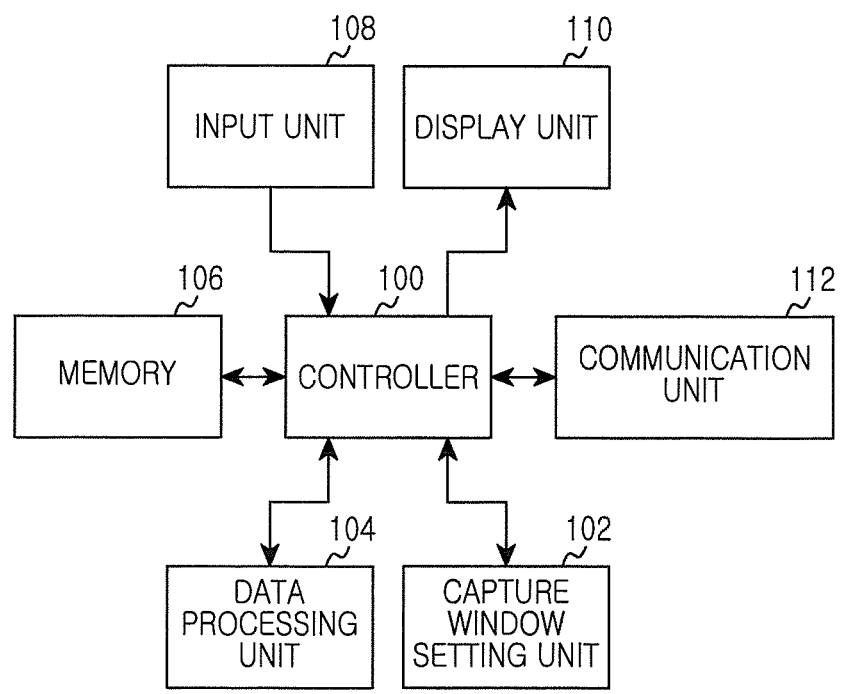
FIG. 1 is a block diagram illustrating a configuration of a portable terminal for performing a picture capture function according to the present disclosure.

FIG. 1 is a block diagram illustrating a configuration of a portable terminal for performing a picture capture function according to the present disclosure.

Referring to FIG. 1, the portable terminal may include a controller 100, a capture window setting unit 102, a data processing unit 104, a memory 106, an input unit 108, a display unit 110, and a communication unit 112.

The controller 100 of the portable terminal controls an overall operation of the portable terminal. For example, the controller 100 processes and controls voice communication and data communication. In addition to conventional functions, the controller 100 sets a capture window for capturing a specific region when performing a picture capture process according to the present disclosure.

In an embodiment, the controller 100 captures an output picture or a partial region of the output picture through the set capture window and acquires capture data. The controller 100 manages the acquired capture data and provides information of the capture data to a user.

After providing information about a plurality of capture data, the controller 100 performs an editing process for selected capture data. Herein, the controller 100 may sense a selection of a capture data editing item or a gesture by the user and may edit the capture data.

The capture window setting unit 102 changes a setting of a size, a position, etc. of the capture window which is previously output under control of the controller 100.

The data processing unit 104 acquires the capture data by capturing all or a part of the output picture under control of the controller 100. Herein, the data processing unit 104 forms a floating window of a transparent layer type on a picture outputted on the display unit 110 and outputs the acquired capture data on the floating window. The data processing unit 104 outputs a plurality of capture data on the floating window to provide a wide choice of the capture data capable of being selected by the user.

Herein, the floating window formed by the data processing unit 104 means a window for outputting information of the data captured by the user. Although output contents of the portable terminal are changed (although contents of an output picture are changed because another application is executed), the floating window remains floating on the output picture.

The memory 106 includes one or more of a Read Only Memory (ROM), a Random Access Memory (RAM), and a flash ROM. The ROM stores a microcode of a program, by which the controller 100, the capture window setting unit 102, and the data processing unit 104 are processed and controlled, and a variety of reference data.

The RAM is a working memory of the controller 100 and stores temporary data that is generated while a variety of programs are performed. The flash ROM stores a variety of rewritable data, such as phonebooks, outgoing messages, and incoming messages. The flash ROM stores the capture data acquired through the capture window according to one embodiment of the present disclosure.

The method described hereunder in the present disclosure may be provided as one or more instructions in one or more software modules stored in the memory 106. The software modules may be executed by the controller 100.

The input unit 108 includes numeral key buttons of '0' to '9' and a plurality of function keys such as a menu button, a cancel button, an OK button, a talk button, an end button, an Internet access button, a navigation key (or directional key) button, and a character input key. The input unit 108 provides key input data corresponding to a key pushed by the user to the controller 100. In addition, the input unit 108 provides data for input of the user for setting the capture window and data for input of the user for performing a picture capture to the controller 100 according to the present disclosure.

The display unit 110 displays state information which is generated while the portable terminal is operated, characters, one or more moving and still pictures, and the like. The display unit 110 may be a color Liquid Crystal Display (LCD), an Active Matrix Organic Light Emitting Diode (AMOLED), or the like. The display unit 110 includes a touch input device. When the display unit 110 is applied to a touch input type portable terminal, it may be used as an input device. In addition, the display unit 110 outputs the capture window for picture capture and the floating window including the capture data and outputs a capture window setting process and a capture data editing process according to the present disclosure.

In fact, it is within the spirit and scope of the presently claimed disclosure that the input unit 108 and display unit 110 could all be served by a single touch screen. That is, a touch sensitive display, called as a touch screen, may be used as the display unit 110. In this situation, touch input may be performed via the touch sensitive display.

The communication unit 112 transmits and receives a Radio Frequency (RF) signal of data which is input and output through an antenna (not shown). For example, in a transmitting process, data to be transmitted is subject to a channel-coding process and a spreading process, and then the data is transformed to an RF signal. In a receiving process, the RF signal is received and transformed to a baseband signal, and the base-band signal is subject to a de-spreading process and a channel-decoding process, thereby restoring the data.

The functions of the capture window unit 102 and the data processing unit 104 may be performed by the controller 100 of the portable terminal. However, the present disclosure includes the controller 100, the capture window unit 102, and the data processing unit 104. These are example configurations for the convenience of explanation and are not limited to a scope of the prevent disclosure. It will be understood by those skilled in the art that various changes in form and details may be made therein without departing from the spirit and scope of the present disclosure. For example, all of the components 100-104 may be arranged to be processed in the controller 100.

According to the present disclosure, for example, an electronic device comprising one or more controller, a touch screen, a memory and one or software modules stored in the memory configured for execution by the controller, the software modules comprising one or more instruction to perform methods described hereunder.

Figure 2:
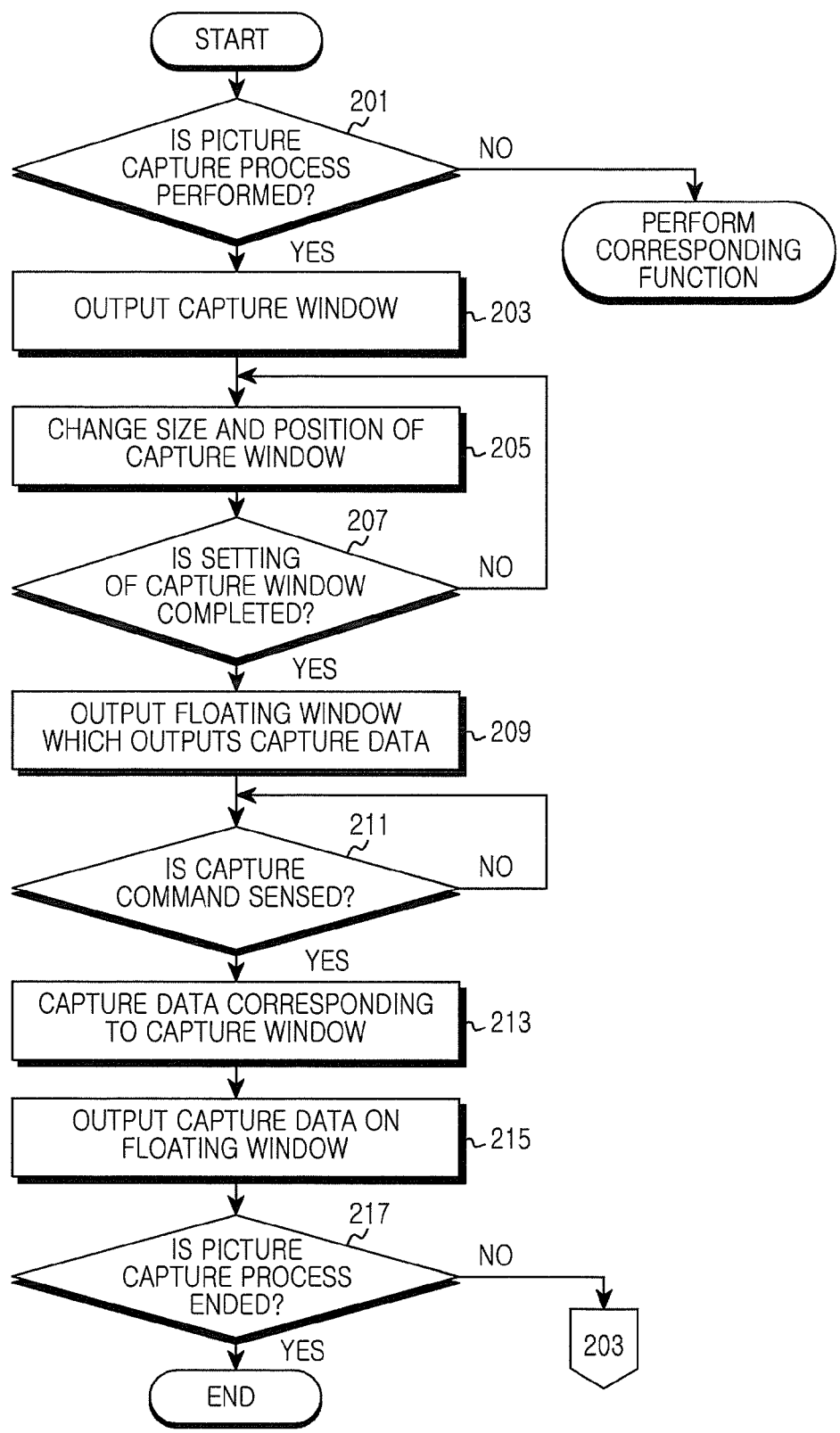
FIG. 2 is a flowchart illustrating a picture capture process of a portable terminal according to one embodiment of the present disclosure.

FIG. 2 is a flowchart illustrating a picture capture process of a portable terminal according to one embodiment of the present disclosure.

Referring to FIG. 2, the portable terminal may capture a part of an output picture according to one embodiment of the present disclosure as well as the entire output picture. The portable terminal provides a plurality of capture data such that a user uses a necessary capture data.

In order to perform the above-described capture process, the portable terminal verifies whether to perform a picture capture process in block 201. Herein, the picture capture process means a process of capturing all or a part of an output picture.

If the picture capture process is not performed in block 201, the portable terminal performs a corresponding function (e.g., waiting mode).

Alternatively, when it is verified that the picture capture process is performed in block 201, the portable terminal proceeds to block 203 and outputs a capture window. The portable terminal proceeds to block 205 and changes a setting of the capture window while changing a size, a position, etc. of the capture window. Herein, the capture window means a window indicating a part capable of being actually captured on the output picture. It is possible to change a size and a position of the capture window according to input of a user. In addition, if a predetermined touch input (e.g., a long touch, a short touch, a continuous touch, flicking, a gesture such as the user puts and twists a finger on the capture window, etc.) for an image or text region or menu selection for performing capture mode entrance is sensed, the portable terminal may output the capture window. In addition, if a block designation of the text region is sensed, the portable terminal may output the capture window. In addition, if an input of the user, for specifying a touch region, is sensed, the portable terminal may output the capture window.

The portable terminal proceeds to block 207 and verifies whether the setting of the capture window is completed.

If it is verified that the capture window setting process of setting the size and position of the capture window is not completed in block 207, the portable terminal performs the processing of block 205 again. Herein, the portable terminal sets the capture window and selects a region to be captured.

Alternatively, if it is verified that the setting of the capture window is completed in block 207, the portable terminal proceeds to block 209 and outputs a floating window for outputting a capture data. Herein, the capture data is data for a picture captured through the capture window. The portable terminal may generate a floating window like a transparent layer and may output a plurality of capture data on an output picture. Herein, the portable terminal outputs capture data acquired whenever the capture data is acquired on the floating window and provides information regarding the plurality of capture data.

The portable terminal proceeds to block 211 and verifies whether a capture command for performing a picture capture is sensed. Herein, in block 211, the portable terminal verifies whether a request for acquiring capture data for a picture corresponding to the capture window is sensed.

If it is verified that the capture command is not sensed in block 211, the portable terminal performs the processing of block 211 again.

Alternatively, if it is verified that the capture command is sensed, the portable terminal proceeds to block 213, captures a picture corresponding to the capture window, and acquires the capture data. The portable terminal proceeds to block 215 and outputs the acquired capture data on the floating window. Herein, the portable terminal outputs the capture data on the floating window whenever the capture data is acquired. A plurality of capture data may output on the floating window. In addition, the portable terminal outputs a currently output picture and a separate floating window. The portable terminal may output the floating window together in a state where an application is executed or a waiting picture is output.

The portable terminal proceeds to block 217 and verifies whether the picture capture process is ended.

If it is verified that the picture capture process is not ended in block 217, the portable terminal proceeds to block 203, acquires the capture data, and adds the acquired capture data on the floating window.

Alternatively, if it is verified that the picture capture process is ended in block 217, the portable terminal ends the algorithm of FIG. 2.

The method performed according to FIG. 2 may be provided as one or more instructions in one or more software modules stored in the storage unit. In that case, the software modules may be executed by the controller 100.

Figure 3:
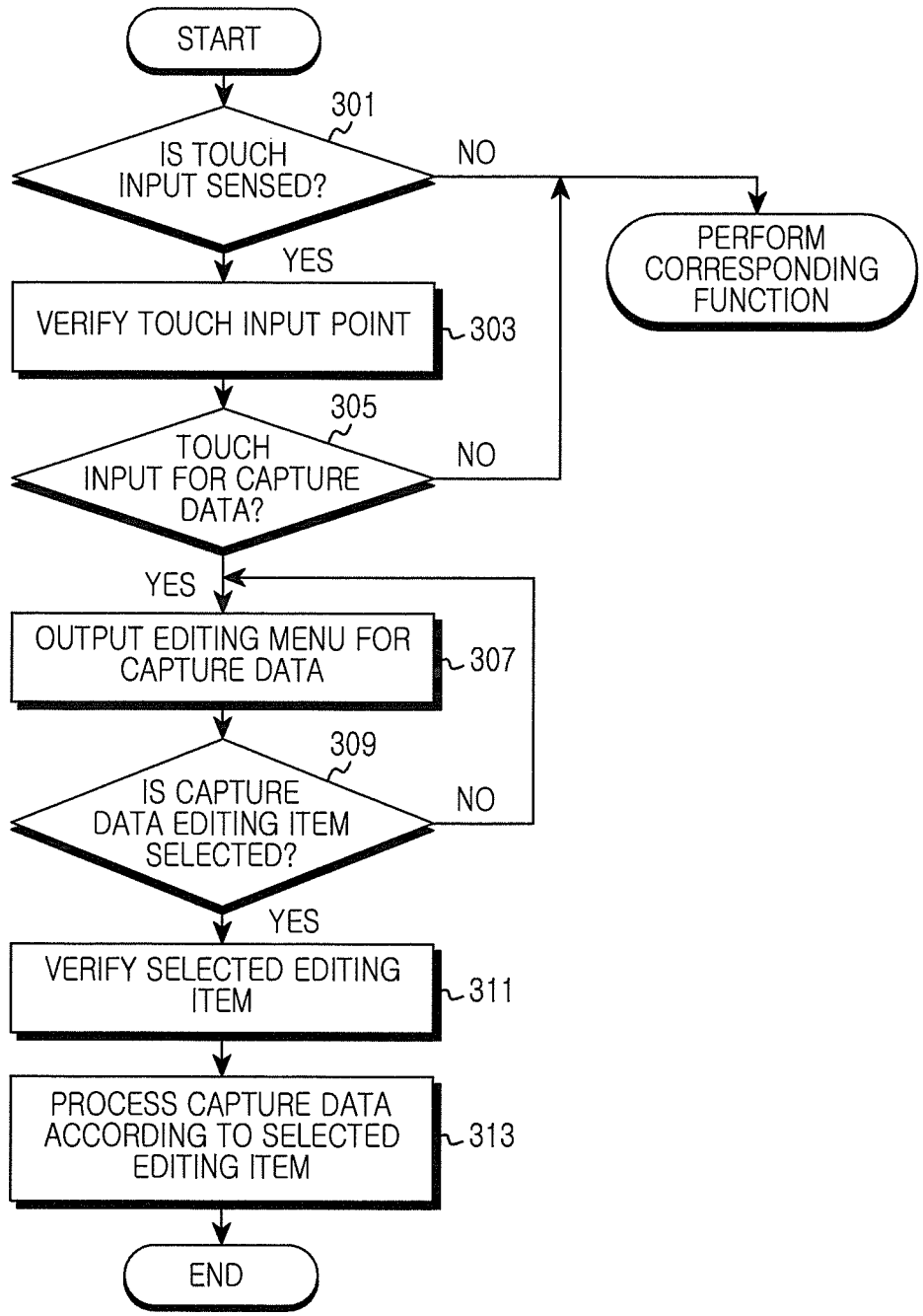
FIG. 3 is a flowchart illustrating a process of editing capture data in a portable terminal according to one embodiment of the present disclosure.

FIG. 3 is a flowchart illustrating a process of editing a capture data in a portable terminal according to one embodiment of the present disclosure.

Referring to FIG. 3, the portable terminal verifies whether a touch input by a user is sensed in block 301.

If a touch input is not sensed in block 301, the portable terminal performs a corresponding function (e.g., waiting mode).

Alternatively, if a touch input is sensed in block 301, the portable terminal proceeds to block 303 and verifies a coordinate (position) of a point where the touch input is sensed. The portable terminal proceeds to block 305 and verifies whether capture data included on a floating window is touched.

If it is verified that the capture data is not touched in block 305, the portable terminal performs an operation (e.g., touch item execution) corresponding to the touch input of the user.

Alternatively, it is verified that the capture data is touched in block 305, the portable terminal proceeds to block 307 and outputs an editing menu for the capture data. The portable terminal proceeds to block 309 and verifies whether a capture data editing item is selected from the user. The editing menu for the capture data may include an item for selecting data to be edited among capture data output on the floating window, an item for moving previously selected capture data, an item for copying previously selected capture data, and an item for pasting previously selected capture data to another application. Herein, the item for copying the previously selected data is an item for copying the previously selected capture data to a floating window and generating a plurality of the same capture data.

If it is verified that the capture data editing item is not selected by the user, the portable terminal proceeds to block 307 and performs the process of allowing the user to select an editing item again.

Alternatively, if it is verified that the capture data editing item is selected by the user in block 309, the portable terminal proceeds to block 311 and verifies an item selected by the user among the capture data editing items. The portable terminal proceeds to block 313 and processes the capture data according to the editing item selected by the user.

For example, if the item for selecting a capture data to be edited is selected from the user, the portable terminal may select the capture data selected by the user and may display the selected item to be separated from capture data which is not selected (e.g., the portable terminal shades the selected capture data). In addition, if the item for moving the previously selected capture data is selected from the user, the portable terminal changes a position of the previously selected capture data. Herein, the portable terminal changes a position of the capture data output on the floating window. In addition, if the item for deleting the previously selected capture data is selected from the user, the portable terminal deletes the previously selected capture data on the floating window. In addition, if the item for copying the previously selected capture data is selected from the user, the portable terminal copies the same caption data as the previously selected capture data on the floating window. In addition, if the item for pasting the previously selected capture data to another application is selected from the user, the portable terminal pastes the previously selected capture data to a text input window, a memo pad, a schedule input picture, or the like.

As described above, the portable terminal which processes the capture data ends the algorithm of FIG. 3.

As shown in FIG. 3, if the user directly selects the capture data included on the floating window and selects an editing item, the process of editing the capture data is as described. However, the portable terminal according to the present disclosure may sense a predetermined gesture and may edit a selected capture data.

Herein, the portable terminal selects capture data to be edited through a touch input. The portable terminal may output a delete button, output a menu for performing various functions (e.g., a self-reproduction function, a paste function, a delete function), paste the capture data, perform self-reproduction, move a position of the capture data, or change a size of the capture data according to predetermined gestures (e.g., a long touch, a short touch, a continuous touch, movement, a flicking multi-touch, and so forth).

For example, the portable terminal selects a capture data to be edited on the floating window. If a single touch input is sensed, the portable terminal pastes the selected capture data.

In addition, the portable terminal selects a capture data to be edited on the floating window. If a continuous touch input is sensed, the portable terminal generates the same capture data as the selected capture data.

In addition, the portable terminal selects capture data to be edited on the floating window. If a flicking input is sensed, the portable terminal moves the selected capture data in a flicking direction.

In addition, the portable terminal selects a capture data to be edited on the floating window. If a long touch input is sensed, the portable terminal deletes the selected capture data.

In addition, the portable terminal selects capture data to be edited on the floating window. If a control touch input is sensed, the portable terminal enlarges or reduces a size of the selected capture data. Herein, the control touch input is an input of the user for changing a size of the selected capture data. The control touch input may include a multi-touch input for controlling a size change by a touch input at two points and a finger touch input for controlling size change through dragging where the touch input is maintained during a certain time.

As described above, the gesture for editing the capture data may be set by the user of the portable terminal.

The method performed according to FIG. 3 may be provided as one or more instructions in one or more software modules stored in the storage unit. In that case, the software modules may be executed by the controller 100.

FIGS. 4A through 4D illustrate a process of setting a capture window in a portable terminal according to one embodiment of the present disclosure.

Referring to FIGS. 4A through 4D, if a capture command by a user of the portable terminal is sensed, as shown in FIG. 4A, the portable terminal outputs a capture window. Herein, the capture window is a region for selecting a part to be captured on an output picture. The portable terminal outputs the capture window, changes a setting of the previously output capture window, and may perform a picture capture for a specific region the user wants to output.

Herein, the capture window may be classified into an internal window 400, an external window 404, and a window boundary 402. The internal window 400 is a window for displaying a part to be captured. The external window 404 is a window for displaying a part which is not captured on an output picture. In addition, the window boundary 402 is a boundary between the internal window 400 and the external window 404. Each of the internal window 400, the window boundary 402, and the external window 404 may be used as a touch input region for changing a setting of the capture window.

For example, the portable terminal may generate and output a capture window of a tetragonal type using positions of two points simultaneously touched by the user as diagonal vertexes. When the user of the portable terminal wants to change a position of a previously output window, as shown in FIG. 4B, if the user moves the internal window to a position to be changed in a state where he or she touches the internal window, the position of the internal window is moved from a first position 410 to a second position 412.

In addition, if the user of the portable terminal wants to change a size of the previously output capture window, as shown in FIG. 4C, the portable terminal enlarges and reduces the size of the capture window 420 in a state where the user touches the window boundary. Herein, the user of the portable terminal may change the size of the capture window in a desired direction using window boundaries of four sides of the capture window.

In addition, if the user of the portable terminal touches the external window, as shown in FIG. 4D, the portable terminal deletes the previously output capture window 430 and is changed to an initial state capable of generating a new capture window.

In addition, the portable terminal may sense one touch input of the user and movement after the touch input is sensed and may generate a touch window of a free curve shape along a touch input position.

The method performed according to FIG. 4A through 4D may be provided as one or more instructions in one or more software modules stored in the storage unit. In that case, the software modules may be executed by the controller 100.

FIGS. 5A through 5D illustrate a picture capture process of a portable terminal according to one embodiment of the present disclosure.

Figure 5A:
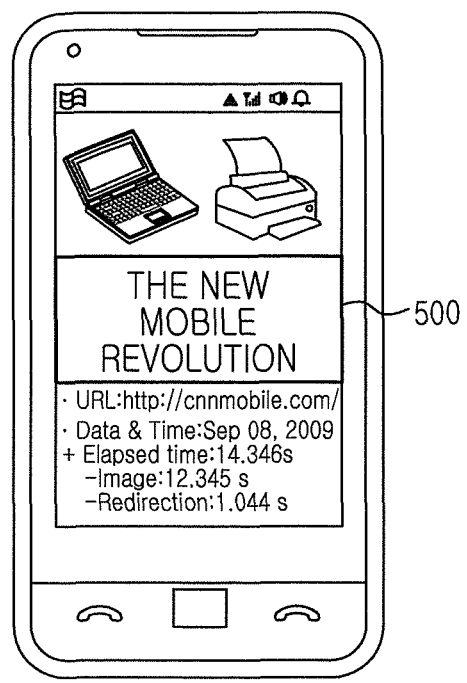
FIGS. 5A through 5D illustrate a picture capture process of a portable terminal according to one embodiment of the present disclosure.

As shown FIG. 5A, the portable terminal outputs a capture window 500 for capturing an output picture. FIG. 5A illustrates a picture which outputs the capture window in a state where a webpage is output. Herein, if a predetermined touch input (e.g., a long touch, a short touch, a continuous touch, flicking, a gesture such as a user placing and twisting his or her finger on the capture window, etc.) for an image or text region or menu selection for performing capture mode entrance is sensed, the portable terminal may output the capture window.

In addition, the portable terminal may change a size and a position of the previously output capture window according to the touch input of the user.

If a capture command by the user is sensed in a state where the size and the position of the capture window are set, the portable terminal acquires capture data corresponding to the capture window. Because a general portable terminal stores capture data in a clipboard when performing a capture process, a user of the general portable terminal may not verify contents of the capture data stored in the clipboard after the capture process is performed. Thus, there is a problem in that the general portable terminal may store only a capture data acquired through a capture process which is recently performed in the clipboard.

However, in order to address the above-described problem, the portable terminal according to the present disclosure generates and outputs a floating window of a transparent layer type on an upper end of an output picture when performing a capture process and outputs acquired capture data on the floating window.

Figure 5B:
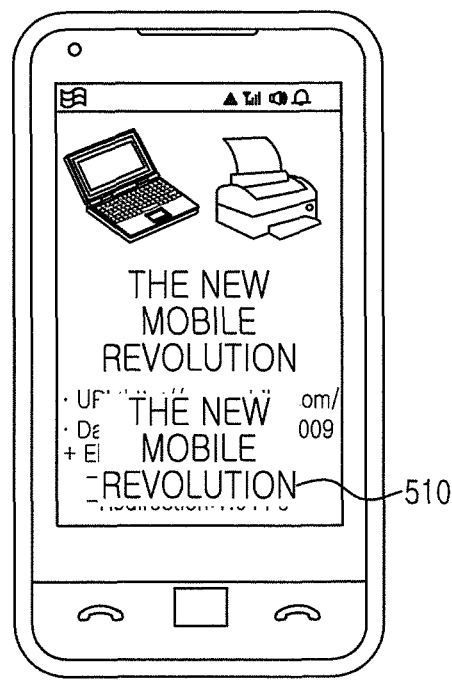

For this reason, as shown in FIG. 5B, the portable terminal may output capture data 510 on a previously output webpage.

Figure 5C:
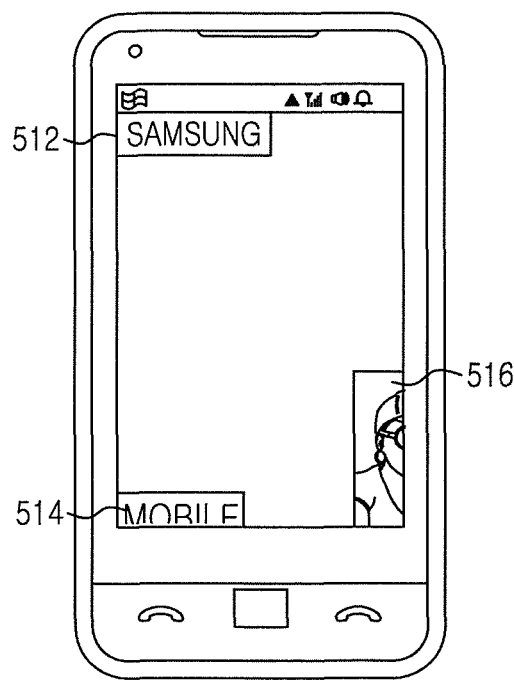

In addition, as shown in FIG. 5C, the portable terminal may output a plurality of capture data on the floating window. A position and a size of the capture data output on the floating window may also be changed according to a request of the user. FIG. 5C illustrates the floating window which outputs the plurality of capture data. The plurality of capture data include capture data 512 for a text called "SAMSUNG", capture data 514 for a partial article of a webpage, and capture data 516 for an image data. The shown capture data are output as partial contents of the capture data. For one example, when the capture data 516 for the image data is moved to the center of a picture, the entire image of the capture data may be output. In addition, when the portable terminal generates the capture data 512 for the text, it generates image data and text data with respect to the text together. This means that the portable terminal pastes the text as well as the image data when pasting the text data to an application such as a memo pad through capture of the text data. For another example, when the portable terminal pastes capture data to another application, it recognizes characters through a character recognition function and pastes the recognized character as a text data.

Although the portable terminal ends a webpage and executes another application, it outputs the capture data such that the user of the portable terminal easily ascertains the captured capture data and applies the capture data to a desired application.

Figure 5D:
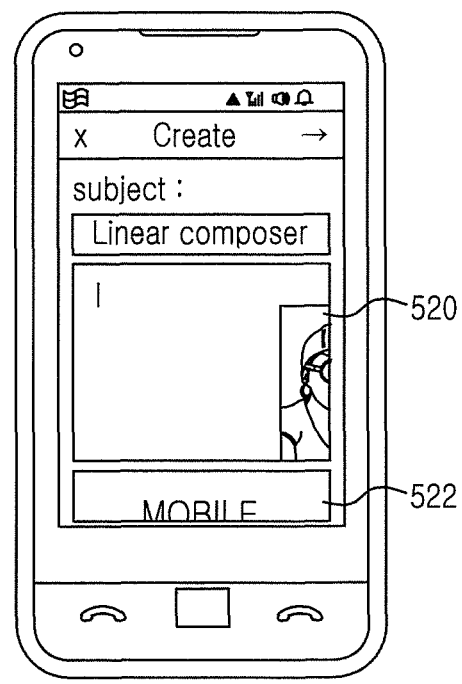

As shown in FIG. 5D, the portable terminal outputs capture data 520 and 522 in a state where a text message application is executed. The portable terminal may include capture data selected according to a selection of the user on a text input picture. Herein, the portable terminal may input contents of the capture data as a text type through a character recognition function or may input capture data of an image type as an attachment type.

The method performed according to FIG. 5A through 5D may be provided as one or more instructions in one or more software modules stored in the storage unit. In that case, the software modules may be executed by the controller 100.

FIGS. 6A through 6E illustrate a capture data editing process of a portable terminal according to one embodiment of the present disclosure.

Figure 6C:
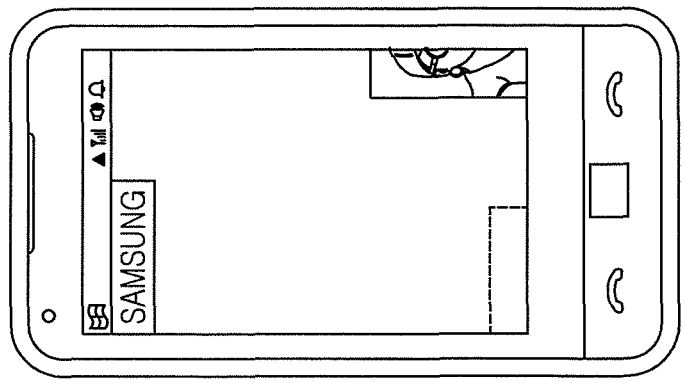
FIGS. 6A through 6E illustrate a capture data editing process of a portable terminal according to one embodiment of the present disclosure.
Figure 6B:
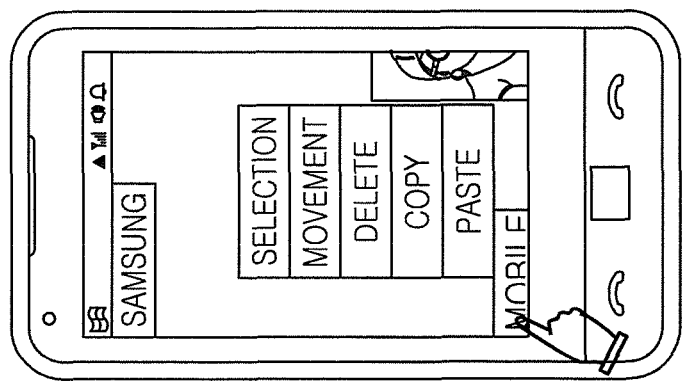
Figure 6A:
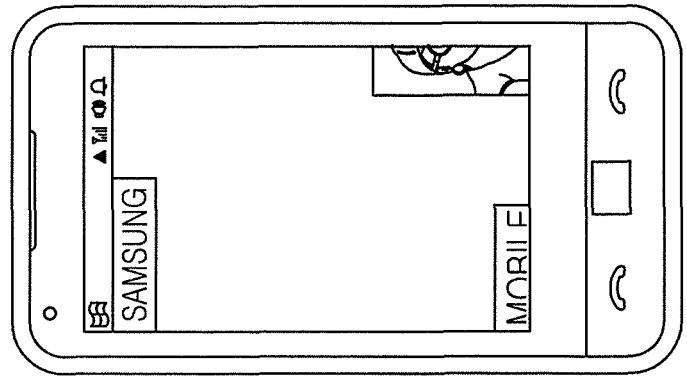

As shown in FIG. 6A, the portable terminal outputs a floating window including a plurality of capture data. The capture data included on the floating window may be edited through editing processes such as a position change process, a size change process, a delete process, a selection process, a copy process, and a paste process.

If the portable terminal for performing the above-described editing process senses a selection 610 (e.g., a continuous touch, a long touch, a short touch, etc.) of capture data to be edited, as shown in FIG. 6B, it outputs editing items capable of editing the selected capture data.

Therefore, if the user of the portable terminal selects the output editing item, the portable terminal performs an editing process for the selected capture data.

For example, if the user selects a delete item for deleting the capture data, as shown in FIG. 6C, the portable terminal may delete the selected capture data. Herein, if the user of the portable terminal selects capture data to be deleted through a selection item among editing items output after the user touches the capture data, the portable terminal may delete the selected capture data 612.

Figure 6D:
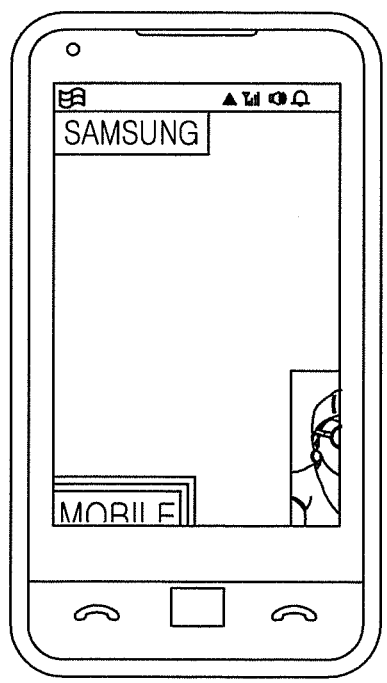

In addition, if the user of the portable terminal selects a copy item for copying the capture data, as shown in FIG. 6D, the portable terminal copies and generates the same data 614 as the selected capture data.

Figure 6E:
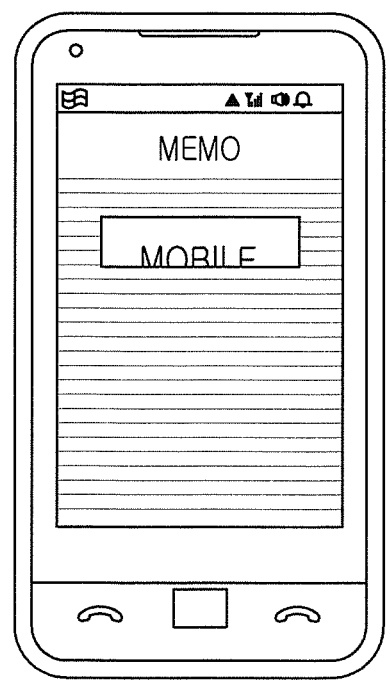

In addition, if the user of the portable terminal selects a paste item for pasting the capture data, as shown in FIG. 6E, the portable terminal pastes the selected capture data 616 to another application. Herein, if the user of the portable terminal selects capture data to be pasted through the selection item among the editing items output after the user touches the capture data, the portable terminal may paste the selected capture data to an application such as a memo pad, a text message, or a calendar.

Also, if the user of the portable terminal wants to paste capture data for text data, the portable terminal recognizes a text from the text data and pastes the recognized text as a text type or an image type to another application.

In addition, as described above, the portable terminal may sense a gesture of the user and may edit a selected capture data.

Herein, the portable terminal may perform editing processes such as a position change process, a size change process, a delete process, a selection process, a copy process, and a paste process using a predetermined gesture of the user without using the editing items shown in FIG. 6B.

The method performed according to FIGS. 6A and 6B may be provided as one or more instructions in one or more software modules stored in the storage unit. In that case, the software modules may be executed by the controller 100.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, in order to improve picture capture performance of the portable terminal, the present disclosure may perform a picture capture for a specific region on an output picture and may provide information of captured data such that the user of the portable terminal verifies whether a desired part is accurately captured.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An apparatus for performing a picture capture in a portable terminal, the apparatus comprising:
a memory element; and
one or more processors coupled to the memory element, the one or more processors configured to:
output a screen on a display, in response to a first user input;
display, on the screen, a capture window of a transparent layer type specifying a region of the screen, in response to a second user input;
change a size or a position of the displayed capture window, in response to a third user input;
acquire capture data for a changed region corresponding to the changed capture window, in response to a data-capturing command;
output the capture data and another capture data which has been previously captured from another screen distinct from the screen on a floating window while the screen is displayed;
output a menu superimposed on the floating window in response to a fourth input for selecting one of the capture data and the another capture data, the menu comprising a plurality of objects for editing the selected one; and
execute a function indicated by the object in response to a fifth input for selecting an object among the plurality of objects.

2. The apparatus of claim 1, wherein the one or more processors is further configured to generate the floating window after acquiring the capture data for the changed region corresponding to the changed capture window, and output the acquired capture data on the floating window.

3. A method of performing a picture capture in a portable terminal, the method comprising:
outputting a screen on a display, in response to a first user input;
displaying, on the screen, a capture window of a transparent type specifying a region of the screen, in response to a second user input;
changing a size or a position of the displayed capture window, in response to a third user input;
acquiring capture data for a changed region corresponding to the changed capture window, in response to a data-capturing command;
outputting the capture data and another capture data which has been previously captured from another screen on a floating window while the screen is displayed;
outputting a menu superimposed on the floating window in response to a fourth input for selecting one of the capture data and the another capture data, the menu comprising a plurality of objects for editing the selected one; and
executing a function indicated by the object in response to a fifth input for selecting an object among the plurality of objects.

4. The method of claim 3, further comprising:
generating the floating window after acquiring the capture data for the changed region corresponding to the changed capture window; and
outputting the acquired capture data on the floating window.

5. A portable terminal configured for performing a picture capture, the portable terminal comprising:
a display unit;
a memory element; and
one or more processors coupled to the memory element, the one or more processors configured to:
output a screen on the display unit, in response to a first user input;
display, on the screen, a capture window of a transparent layer type specifying a region of the screen, in response to a second user input;
change a size or a position of the displayed capture window, in response to a third user input;
acquire capture data for a changed region corresponding to the changed capture window, in response to a data-capturing command;
output the capture data and another capture data which has been previously captured from another screen distinct from the screen on a floating window while the screen is displayed;
output a menu superimposed on the floating window in response to a fourth input for selecting one of the capture data and the another capture data, the menu comprising a plurality of objects for editing the selected one; and execute a function indicated by the object in response to a fifth input for selecting an object among the plurality of objects.

6. The portable terminal of claim 5, wherein the one or more processors is further configured to generate the floating window after acquiring the capture data for the changed region corresponding to the changed capture window, and output the acquired capture data on the floating window.

\* \* \* \* \*